(12) United States Patent
Ashrafi (10) Patent No.: US 10,261,244 B2
(45) Date of Patent: Apr. 16, 2019

(54) SYSTEM AND METHOD FOR PRODUCING VORTEX FIBER

(71) Applicant: NxGen Partners IP, LLC, Dallas, TX (US)

(72) Inventor: Solyman Ashrafi, Plano, TX (US)

(73) Assignee: NxGen Partners IP, LLC, Dallas, TX (US)

( * ) Notice: Subject to any disclaimer, the term of this patent is extended or adjusted under 35 U.S.C. 154(b) by 138 days.

(21) Appl. No.: 15/430,981

(22) Filed: Feb. 13, 2017

(65) Prior Publication Data

US 2017/0233283 A1    Aug. 17, 2017

Related U.S. Application Data

(60) Provisional application No. 62/295,183, filed on Feb. 15, 2016.

(51) Int. Cl.
| | |
|---|---|
| G02B 6/02 | (2006.01) |
| C03B 37/16 | (2006.01) |
| C03B 37/012 | (2006.01) |
| C03B 37/027 | (2006.01) |
| C03B 37/03 | (2006.01) |

(52) U.S. Cl.
CPC .... G02B 6/02342 (2013.01); C03B 37/01231 (2013.01); C03B 37/0279 (2013.01); C03B 37/032 (2013.01); G02B 6/02323 (2013.01); C03B 2203/42 (2013.01); C03B 2205/10 (2013.01); C03B 2205/42 (2013.01); C03B 2205/45 (2013.01)

(58) Field of Classification Search
CPC ............ G02B 6/02342; G02B 6/02323; G01N 21/412; G01F 1/661; C03C 25/1065; C03C 25/06; C03C 3/06; C03C 12/00; C03B 19/06; C03B 37/0217
See application file for complete search history.

(56) References Cited

U.S. PATENT DOCUMENTS

| | | | |
|---|---|---|---|
| 3,459,466 A | 8/1969 | Giordmaine | |
| 3,614,722 A | 10/1971 | Jones | |
| 3,832,434 A * | 8/1974 | Flood | B01J 2/00 23/313 AS |
| 4,227,806 A * | 10/1980 | Watkins | G01N 21/412 356/73.1 |
| 4,379,409 A | 4/1983 | Primbsch et al. | |
| 4,501,157 A * | 2/1985 | Perkinson | G01F 1/661 73/861.24 |
| 4,503,336 A | 3/1985 | Hutchin et al. | |

(Continued)

OTHER PUBLICATIONS

Solyman Ashrafi, Channeling Radiation of Electrons in Crystal Lattices, Essays on Classical and Quantum Dynamics, Gordon and Breach Science Publishers, 1991.

(Continued)

*Primary Examiner* — Akm E Ullah (57) ABSTRACT

A preform for making a vortex optical fiber comprises a glass cylinder formed substantially of silicone dioxide that defines a core portion along a longitudinal axis of the glass cylinder and a cladding portion surrounding the core portion. The glass cylinder further defines a plurality of holes running parallel to the longitudinal axis from a first end of the glass cylinder to a second end of the glass cylinder.

16 Claims, 6 Drawing Sheets

(56) References Cited

U.S. PATENT DOCUMENTS

| | | | |
|---|---|---|---|
| 4,561,871 A * | 12/1985 | Berkey | C03B 37/01217 65/412 |
| 4,736,463 A | 4/1988 | Chavez | |
| 4,862,115 A | 8/1989 | Lee et al. | |
| 5,051,754 A | 9/1991 | Newberg | |
| 5,220,163 A | 6/1993 | Toughlian et al. | |
| 5,222,071 A | 6/1993 | Pezeshki et al. | |
| 5,272,484 A | 12/1993 | Labaar | |
| 5,543,805 A | 8/1996 | Thaniyavarn | |
| 5,555,530 A | 9/1996 | Meehan | |
| 6,000,241 A * | 12/1999 | Ranade | C03C 12/00 264/9 |
| 6,337,659 B1 | 1/2002 | Kim | |
| 6,992,829 B1 | 1/2006 | Jennings et al. | |
| 7,577,165 B1 | 8/2009 | Barrett | |
| 7,716,952 B2 * | 5/2010 | Schotz | C03B 37/01211 65/378 |
| 7,729,572 B1 | 6/2010 | Pepper et al. | |
| 7,792,431 B2 | 9/2010 | Jennings et al. | |
| 8,209,999 B2 * | 7/2012 | Schumacher | C03B 19/06 501/33 |
| 8,432,884 B1 | 4/2013 | Ashrafi | |
| 8,503,546 B1 | 8/2013 | Ashrafi | |
| 8,559,823 B2 | 10/2013 | Izadpanah et al. | |
| 8,811,366 B2 | 8/2014 | Ashrafi | |
| 9,077,577 B1 | 7/2015 | Ashrafi | |
| 2002/0026810 A1 * | 3/2002 | Clasen | C03C 3/06 65/17.6 |
| 2005/0254826 A1 | 11/2005 | Jennings et al. | |
| 2005/0259914 A1 | 11/2005 | Padgett et al. | |
| 2010/0013696 A1 | 1/2010 | Schmitt et al. | |
| 2012/0207470 A1 | 8/2012 | Djordevic et al. | |
| 2012/0321265 A1 * | 12/2012 | Terruzzi | C03C 25/1065 385/128 |
| 2013/0027774 A1 | 1/2013 | Bovino et al. | |
| 2013/0235744 A1 | 9/2013 | Chen et al. | |
| 2014/0355624 A1 | 12/2014 | Li et al. | |
| 2015/0098697 A1 | 4/2015 | Marom et al. | |

OTHER PUBLICATIONS

Solyman Ashrafi, Solar Flux Forecasting Using Mutual Information with an Optimal Delay, Advances in the Astronautical Sciences, American Astronautical Society, vol. 84 Part II, 1993.

Solyman Ashrafi, PCS system design issues in the presence of microwave OFS, Electromagnetic Wave Interactions, Series on Stability, Vibration and Control of Systems, World Scientific, Jan. 1996.

Solyman Ashrafi, Performance Metrics and Design Parameters for an FSO Communications Link Based on Multiplexing of Multiple Orbital-Angular-Momentum Beams, IEEE Globecom 2014, paper 1570005079, Austin, TX, Dec. 2014(IEEE, Piscataway, NJ, 2014).

Solyman Ashrafi, Optical Communications Using Orbital Angular Momentum Beams, Adv. Opt. Photon. 7, 66-106, Advances in Optics and Photonic, 2015.

Solyman Ashrafi, Performance Enhancement of an Orbital-Angular-Momentum based Free-space Optical Communications Link Through Beam Divergence Controlling, IEEE/OSA Conference on Optical Fiber Communications (OFC) and National Fiber Optics Engineers Conference (NFOEC),paper M2F.6, Los Angeles, CA, Mar. 2015 (Optical Society of America, Washington, D.C., 2015).

Solyman Ashrafi, Experimental demonstration of enhanced spectral efficiency of 1.18 symbols/s/Hz using multiple-layer-overlay modulation for QPSK over a 14-km fiber link. OSA Technical Digest (online), paper JTh2A.63. The Optical Society, 2014.

Solyman Ashrafi, Link Analysis of Using Hermite-Gaussian Modes for Transmitting Multiple Channels in a Free-Space Optical Communication System, The Optical Society, vol. 2, No. 4, Apr. 2015.

Solyman Ashrafi, Performance Metrics and Design Considerations for a Free-Space Optical Orbital-Angular-Momentum Multiplexed Communication Link, The Optical Society, vol. 2, No. 4, Apr. 2015.

Solyman Ashrafi, Demonstration of Distance Emulation for an Orbital-Angular-Momentum Beam. OSA Technical Digest (online), paper STh1F.6. The Optical Society, 2015.

Solyman Ashrafi, Free-Space Optical Communications Using Orbital-Angular-Momentum Multiplexing Combined with MIMO-Based Spatial Multiplexing. Optics Letters, vol. 40, No. 18, Sep. 4, 2015.

Solyman Ashrafi, Enhanced Spectral Efficiency of 2.36 bits/s/Hz Using Multiple Layer Overlay Modulation for QPSK over a 14-km Single Mode Fiber Link. OSA Technical Digest (online), paper SW1M.6. The Optical Society, 2015.

Solyman Ashrafi, Experimental Demonstration of a 400-Gbit/s Free Space Optical Link Using Multiple Orbital-Angular-Momentum Beams with Higher Order Radial Indices. OSA Technical Digest (online), paper SW4M.5. The Optical Society, 2015.

Solyman Ashrafi, Experimental Demonstration of 16-Gbit/s Millimeter-Wave Communications Link using Thin Metamaterial Plates to Generate Data-Carrying Orbital-Angular-Momentum Beams, ICC 2015, London, UK, 2014.

Solyman Ashrafi, Experimental Demonstration of Using Multi-Layer-Overlay Technique for Increasing Spectral Efficiency to 1.18 bits/s/Hz in a 3 Gbit/s Signal over 4-km Multimode Fiber. OSA Technical Digest (online), paper JTh2A.63. The Optical Society, 2015.

Solyman Ashrafi, Experimental Measurements of Multipath-Induced Intra- and Inter-Channel Crosstalk Effects in a Millimeter-wave Communications Link using Orbital-Angular-Momentum Multiplexing, IEEE International Communication Conference(ICC) 2015, paper1570038347, London, UK, Jun. 2015(IEEE, Piscataway, NJ, 2015).

Solyman Ashrafi, Performance Metrics for a Free-Space Communication Link Based on Multiplexing of Multiple Orbital Angular Momentum Beams with Higher Order Radial Indice. OSA Technical Digest (online), paper JTh2A.62. The Optical Society, 2015.

Solyman Ashrafi, 400-Gbit/s Free Space Optical Communications Link Over 120-meter using Multiplexing of 4 Collocated Orbital-Angular-Momentum Beams, IEEE/OSA Conference on Optical Fiber Communications (OFC) and National Fiber Optics Engineers Conference (NFOEC),paper M2F.1, Los Angeles, CA, Mar. 2015 (Optical Society of America, Washington, D.C., 2015).

Solyman Ashrafi, Experimental Demonstration of Two-Mode 16-Gbit/s Free-Space mm-Wave Communications Link Using Thin Metamaterial Plates to Generate Orbital Angular Momentum Beams, Optica, vol. 1, No. 6, Dec. 2014.

Solyman Ashrafi, Demonstration of an Obstruction-Tolerant Millimeter-Wave Free-Space Communications Link of Two 1-Gbaud 16-QAM Channels using Bessel Beams Containing Orbital Angular Momentum, Third International Conference on Optical Angular Momentum (ICOAM), Aug. 4-7, 2015, New York USA.

Solyman Ashrafi, An Information Theoretic Framework to Increase Spectral Efficiency, IEEE Transactions on Information Theory, vol. XX, No. Y, Oct. 2014, Dallas, Texas.

Solyman Ashrafi, Acoustically induced stresses in elastic cylinders and their visualization, The Journal of the Acoustical Society of America 82(4):1378-1385, Sep. 1987.

Solyman Ashrafi, Splitting of channeling-radiation peaks in strained-layer superlattices, Journal of the Optical Society of America B 8(12), Nov. 1991.

Solyman Ashrafi, Experimental Characterization of a 400 Gbit/s Orbital Angular Momentum Multiplexed Free-space Optical Link over 120-meters, Optics Letters, vol. 41, No. 3, pp. 622-625, 2016.

Solyman Ashrafi, Orbital-Angular-Momentum-Multiplexed Free-Space Optical Communication Link Using Transmitter Lenses, Applied Optics, vol. 55, No. 8, pp. 2098-2103, 2016.

Solyman Ashrafi, 32 Gbit/s 60 GHz Millimeter-Wave Wireless Communications using Orbital-Angular-Momentum and Polarization Mulitplexing, IEEE International Communication Conference (ICC) 2016, paper 1570226040, Kuala Lumpur, Malaysia, May 2016 (IEEE, Piscataway, NJ, 2016).

Solyman Ashrafi, Tunable Generation and Angular Steering of a Millimeter-Wave Orbital-Angular-Momentum Beam using Differential Time Delays in a Circular Antenna Array, IEEE International Communication Conference (ICC) 2016, paper 1570225424, Kuala Lumpur, Malaysia, May 2016 (IEEE, Piscataway, NJ, 2016).

(56) References Cited

OTHER PUBLICATIONS

Solyman Ashrafi, A Dual-Channel 60 GHz Communications Link Using Patch Antenna Arrays to Generate Data-Carrying Orbital-Angular-Momentum Beams, IEEE International Communication Conference (ICC) 2016, paper 1570224643, Kuala Lumpur, Malaysia, May 2016 (IEEE, Piscataway, NJ, 2016).
Solyman Ashrafi, Demonstration of OAM-based MIMO FSO link using spatial diversity and MIMO equalization for turbulence mitigation, IEEE/OSA Conference on Optical Fiber Communications (OFC), paper Th1H.2, Anaheim, CA, Mar. 2016 (Optical Society of America, Washington, D.C., 2016).
Solyman Ashrafi, Dividing and Multiplying the Mode Order for Orbital-Angular-Momentum Beams, European Conference on Optical Communications (ECOC), paper Th.4.5.1, Valencia, Spain, Sep. 2015.
Solyman Ashrafi, Exploiting the Unique Intensity Gradient of an Orbital-Angular-Momentum Beam for Accurate Receiver Alignment Monitoring in a Free-Space Communication Link, European Conference on Optical Communications (ECOC), paper We.3.6.2, Valencia, Spain, Sep. 2015.
Solyman Ashrafi, Experimental Demonstration of a 400-Gbit/s Free Space Optical Link using Multiple Orbital-Angular-Momentum Beams with Higher Order Radial Indices, APS/IEEE/OSA Conference on Lasers and Electro-Optics (CLEO), paper SW4M.5, San Jose, CA, May 2015 (OSA, Wash., D.C., 2015).
Solyman Ashrafi, Spurious Resonances and Modelling of Composite Resonators, 37th Annual Symposium on Frequency Control, 1983.
Solyman Ashrafi, Splitting and contrary motion of coherent bremsstrahlung peaks in strained-layer superlattices, Journal of Applied Physics 70:4190-4193, Dec. 1990.
Solyman Ashrafi, Nonlinear Techniques for Forecasting Solar Activity Directly From its Time Series, Proceedings of Flight Mechanics/Estimation Theory Symposium, National Aeronautics and Space Administration, May 1992.
Solyman Ashrafi, Demonstration of using Passive Integrated Phase Masks to Generate Orbital-Angular-Momentum Beams in a Communications Link, APS/IEEE/OSA Conference on Lasers and Electro-Optics (CLEO), Paper 2480002, San Jose, CA, Jun. 2016 (OSA, Wash., D.C., 2016).
Solyman Ashrafi, Combining Schatten's Solar Activity Prediction Model with a Chaotic Prediction Model, National Aeronautics and Space Administration, Nov. 1991.
Solyman Ashrafi, Detecting and Disentangling Nonlinear Structure from Solar Flux Time Series, 43rd Congress of the International Astronautical Federation, Aug. 1992.
Solyman Ashrafi, Physical Phaseplate for the Generation of a Millimeter-Wave Hermite-Gaussian Beam, IEEE Antennas and Wireless Propagation Letters, RWS 2016; pp. 234-237.
Solyman Ashrafi, Future Mission Studies: Forecasting Solar Flux Directly From Its Chaotic Time Series, Computer Sciences Corp., Dec. 1991.
Solyman Ashrafi, CMA Equalization for a 2 Gb/s Orbital Angular Momentum Multiplexed Optical Underwater Link through Thermally Induced Refractive Index Inhomogeneity, APS/IEEE/OSA Conference on Lasers and Electro-Optics (CLEO), paper 2479987, San Jose, CA, Jun. 2016 (OSA, Wash., D.C., 2016).
Solyman Ashrafi, 4 Gbit/s Underwater Transmission Using OAM Multiplexing and Directly Modulated Green Laser, APS/IEEE/OSA Conference on Lasers and Electro-Optics (CLEO), paper 2477374, San Jose, CA, Jun. 2016 (OSA, Wash., D.C., 2016).
Solyman Ashrafi, Evidence of Chaotic Pattern in Solar Flux Through a Reproducible Sequence of Period-Doubling-Type Bifurcations; Computer Sciences Corporation (CSC); Flight Mechanics/Estimation Theory Symposium; NASA Goddard Space Flight Center; Greenbelt, Maryland; May 21-23, 1991.
Solyman Ashrafi; Future Mission Studies: Preliminary Comparisons of Solar Flux Models; NASA Goddard Space Flight Center Flight Dynamics Division; Flight Dynamics Division Code 550; Greenbelt, Maryland; Dec. 1991.
H. Yao et al.; Patch Antenna Array for the Generation of Millimeter-wave Hermite-Gaussian Beams, IEEE Antennas and Wireless Propagation Letters; 2016.
Yongxiong Ren et al.; Experimental Investigation of Data Transmission Over a Graded-index Multimode Fiber Using the Basis of Orbital Angular Momentum Modes.
Ren, Y. et al.; Experimental Demonstration of 16 Gbit/s millimeter-wave Communications using MIMO Processing of 2 OAM Modes on Each of Two Transmitter/Receiver Antenna Apertures. In Proc. IEEE GLobal TElecom. Conf. 3821-3826 (2014).
Li, X. et al.; Investigation of interference in multiple-input multiple-output wireless transmission at W band for an optical wireless integration system. Optics Letters 38, 742-744 (2013).
Padgett, Miles J. et al., Divergence of an orbital-angular-momentum-carrying beam upon propagation. New Journal of Physics 17, 023011 (2015).
Mahmouli, F.E. & Walker, D. 4-Gbps Uncompressed Video Transmission over a 60-GHz Orbital Angular Momentum Wireless Channel. IEEE Wireless Communications Letters, vol. 2, No. 2, 223-226 (Apr. 2013).
Vasnetsov, M. V., Pasko, V.A. & Soskin, M.S.; Analysis of orbital angular momentum of a misaligned optical beam; New Journal of Physics 7, 46 (2005).
Byun, S.H., Haji, G.A. & Young, L.E.; Development and application of GPS signal multipath simulator; Radio Science, vol. 37, No. 6, 1098 (2002).
Tamburini, Fabrizio; Encoding many channels on the same frequency through radio vorticity: first experimental test; New Journal of Physics 14, 033001 (2012).
Gibson, G. et al., Free-space information transfer using light beans carrying orbital angular momentum; Optical Express 12, 5448-5456 (2004).
Yan, Y. et al.; High-capacity millimetre-wave communications with orbital angular momentum multiplexing; Nature Communications; 5, 4876 (2014).
Hur, Sooyoung et at.; Millimeter Wave Beamforming for Wireless Backhaul and Access in Small Cell Networks. IEEE Transactions on Communications, vol. 61, 4391-4402 (2013).
Allen, L., Beijersbergen, M., Spreeuw, R.J.C., and Woerdman, J.P.; Orbital Angular Momentum of Light and the Transformation of Laguerre-Gaussian Laser Modes; Physical Review A, vol. 45, No. 11; 8185-8189 (1992).
Anderson, Jorgen Bach; Rappaport, Theodore S.; Yoshida, Susumu; Propagation Measurements and Models for Wireless Communications Channels; 33 42-49 (1995).
Iskander, Magdy F.; Propagation Prediction Models for Wireless Communication Systems; IEEE Transactions on Microwave Theory and Techniques, vol. 50., No. 3, 662-673 (2002).
Wang, Jian, et al.; Terabit free-space data transmission employing orbital angular momentum multiplexing. Nature Photonics; 6, 488-496 (2012).
Katayama, Y., et al.; Wireless Data Center Networking with Steered-Beam mmWave Links; IEEE Wireless Communication Network Conference; 2011, 2179-2184 (2011).
Molina-Terriza, G., et al.; Management of the Angular Momentum of Light: Preparation of Photons in Multidimensional Vector States of Angular Momentum; Physical Review Letters; vol. 88, No. 1; 77, 013601/1-4 (2002).
Rapport, T.S.; Millimeter Wave Mobile Communications for 5G Cellular: It Will Work!; IEEE Access, 1, 335-349 (2013).

* cited by examiner

SYSTEM AND METHOD FOR PRODUCING VORTEX FIBER

CROSS-REFERENCE TO RELATED APPLICATIONS

The present invention claims priority from U.S. Provisional App. No. 62/295,183, entitled SYSTEM AND METHOD FOR PRODUCING VORTEX FIBER, filed on Feb. 15, 2016, which is incorporated herein by reference in its entirety.

TECHNICAL FIELD

The present invention relates to optical fiber production, and more particularly, to the production of optical fiber having improved characteristics for the transmission of orbital angular momentum processed and orthogonal function processed optical signals.

BACKGROUND

The transmission of optical signals within an optical transmission system utilize optical fiber for the transmission of the optical signals between an optical transmitter and an optical receiver. Optical fibers are created using processes that provide the optical fiber with certain known characteristics. These characteristics, such as the refractive index, are achieved using doping and other chemical techniques in order to imbibe the preforms used for creating the optical fiber with certain desired refractive index. The process for doping an optical fiber preform is a costly process and improved methods for generating optical fiber preforms that provide optical fibers having characteristics that better enable the transmission of, for example, orbital angular momentum processed and orthogonal function processed optical signals is desired.

SUMMARY

The present invention, as disclosed and described herein, in one aspect thereof comprises a preform for making a vortex optical fiber comprises a glass cylinder formed substantially of silicone dioxide that defines a core portion along a longitudinal axis of the glass cylinder and a cladding portion surrounding the core portion. The glass cylinder further defines a plurality of holes running parallel to the longitudinal axis from a first end of the glass cylinder to a second end of the glass cylinder.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of a system and method for producing vortex optical fiber are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1:
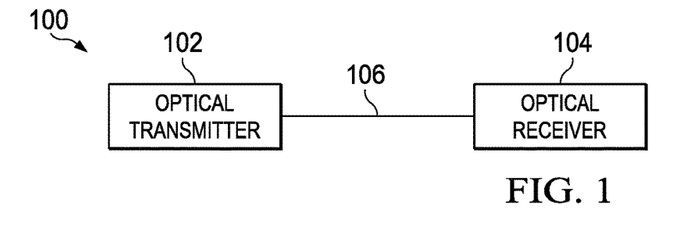
FIG. 1 illustrates the configuration of an optical fiber communication system.

Referring now to the drawings and more particularly to FIG. 1 there is illustrated the general configuration of an optical fiber communication system. The optical fiber communication system 100 includes an optical transmitter 102 and an optical receiver 104. The transmitter 102 and receiver 104 communicate over an optical fiber 106. The transmitter 102 includes information within a light wavelength or wavelengths that is propagated over the optical fiber 106 to the optical receiver 104.

Optical communications network traffic has been steadily increasing by a factor of 100 every decade. The capacity of single mode optical fibers has increased 10,000 times within the last three decades. Historically, the growth in the bandwidth of optical fiber communications has been sustained by information multiplexing techniques using wavelength, amplitude, phase, and polarization of light as a means for encoding information. Several major discoveries within the fiber-optics domain have enabled today's optical networks. An additional discovery was led by Charles M. Kao's groundbreaking work that recognized glass impurities within an optical fiber as a major signal loss mechanism. Existing glass losses at the time of his discovery were approximately 200 dB per kilometer at 1 micrometer.

These discoveries gave birth to optical fibers and led to the first commercial optical fibers in the 1970s, having an attenuation low enough for communication purposes in the range of approximately 20 dBs per kilometer. Referring now to FIGS. 2-5, there is more particularly illustrated the single mode fiber 202, multicore fibers 308, and multimode fibers 410 described herein below. The multicore fibers 308 consist of multiple cores 312 included within the cladding 313 of the fiber. As can be seen in FIG. 3, there are illustrated a three core fiber, seven core fiber, and nineteen core fiber. Multimode fibers 410 comprise fibers comprising a few mode fiber 420 or a multimode fiber 422. Finally, there is illustrated a hollow core fiber 515 including a hollow core 514 within the center of the cladding 516 and sheathing 518.

The development of single mode fibers (SMF) such as that illustrated at 202 (FIG. 2) in the early 1980s reduced pulse dispersion and led to the first fiber-optic based transAtlantic telephone cable. This single mode fiber included a single transmission core 204 within an outer sheathing 206. Development of indium gallium arsenide photodiodes in the early 1990s shifted the focus to near-infrared wavelengths (1550 NM), were silica had the lowest loss, enabling extended reach of the optical fibers. At roughly the same time, the invention of erbium-doped fiber amplifiers resulted in one of the biggest leaps in fiber capacity within the history of communication, a thousand fold increase in capacity occurred over a 10 year period. The development was mainly due to the removed need for expensive repeaters for signal regeneration, as well as efficient amplification of many wavelengths at the same time, enabling wave division multiplexing (WDM).

Throughout the 2000s, increases in bandwidth capacity came mainly from introduction of complex signal modulation formats and coherent detection, allowing information encoding using the phase of light. More recently, polarization division multiplexing (PDM) doubled channel capacity. Though fiber communication based on SMFs featured tremendous growth in the last three decades, recent research has indicated SMF limitations. Non-linear effects in silica play a significant role in long range transmission, mainly through the Kerr effect, where a presence of a channel at one wavelength can change the refractive index of a fiber, causing distortions of other wavelength channels. More recently, a spectral efficiency (SE) or bandwidth efficiency, referring to the transmitted information rate over a given bandwidth, has become theoretically analyzed assuming nonlinear effects in a noisy fiber channel. This research indicates a specific spectral efficiency limit that a fiber of a certain length can reach for any signal to noise (SNR). Recently achieved spectral efficiency results indeed show that the proximity to the spectral efficiency limit, indicating the need for new technologies to address the capacity issue in the future.

Figure 3:
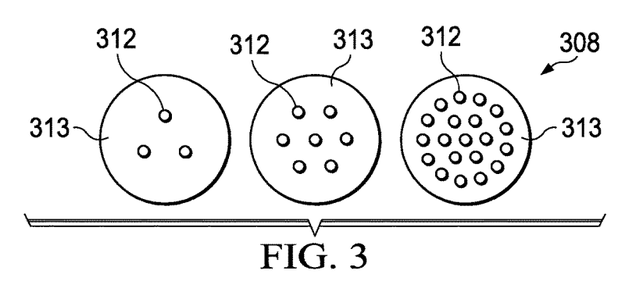
FIG. 3 illustrates multi-core fibers.
Figure 4:
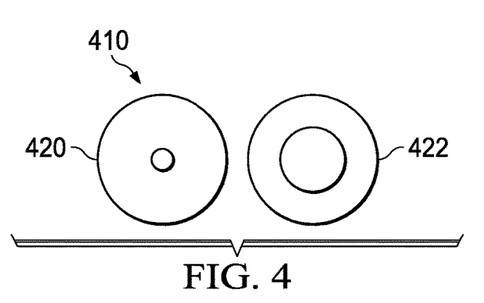
FIG. 4 illustrates multi-mode fibers.
Figure 5:
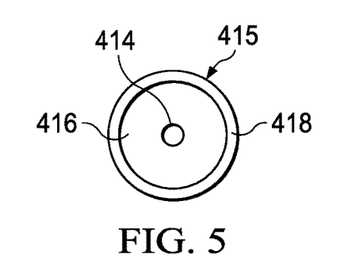
FIG. 5 illustrates a hollow core fiber.

Among several possible directions for optical communications in the future, the introduction of new optical fibers 106 other than single mode fibers 202 has shown promising results. In particular, researchers have focused on spatial dimensions in new fibers, leading to so-called space division multiplexing (SDM) where information is transmitted using cores of multi-core fibers (MCF) 308 (FIG. 3) or mode division multiplexing (MDM) or information is transmitted using modes of multimode fibers (MMFs) 410 (FIG. 4). The latest results show spectral efficiency of 91 bits/S/Hz using twelve core multicore fiber 308 for 52 kilometer long fibers and 12 bits/S/Hz using six mode multimode fiber 410 and 112 kilometer long fibers. Somewhat unconventional transmissions at 2.08 micrometers have also been demonstrated in two 90 meter long photonic crystal fibers, though these fibers had high losses of 4.5 decibels per kilometer.

While offering promising results, these new types of fibers have their own limitations. Being noncircularly symmetric structures, multicore fibers are known to require more complex, expensive manufacturing. On the other hand, multimode fibers 410 are easily created using existing technologies. However, conventional multimode fibers 410 are known to suffer from mode coupling caused by both random perturbations in the fibers and in modal multiplexers/demultiplexers.

Several techniques have been used for mitigating mode coupling. In a strong coupling regime, modal cross talk can be compensated using computationally intensive multi-input multi-output (MIMO) digital signal processing (DSP). While MIMO DSP leverages the technique's current success in wireless networks, the wireless network data rates are several orders of magnitude lower than the ones required for optical networks. Furthermore, MIMO DSP complexity inevitably increases with an increasing number of modes and no MIMO based data transmission demonstrations have been demonstrated in real time thus far. Furthermore, unlike wireless communication systems, optical systems are further complicated because of fiber's nonlinear effects. In a weak coupling regime, where cross talk is smaller, methods that also use computationally intensive adapted optics, feedback algorithms have been demonstrated. These methods reverse the effects of mode coupling by sending a desired superposition of modes at the input, so that desired output modes can be obtained. This approach is limited, however, since mode coupling is a random process that can change on the order of a millisecond in conventional fibers.

Thus, the adaptation of multimode fibers 410 can be problematic in long haul systems where the round trip signal propagation delay can be tens of milliseconds. Though 2×56 GB/S transmission at 8 kilometers length has been demonstrated in the case of two higher order modes, none of the adaptive optics MDM methods to date have demonstrated for more than two modes. Optical fibers act as wave guides for the information carrying light signals that are transmitted over the fiber. Within an ideal case, optical fibers are 2D, cylindrical wave guides comprising one or several cores surrounded by a cladding having a slightly lower refractive index as illustrated in FIGS. 2-5. A fiber mode is a solution (an eigenstate) of a wave guide equation describing the field distribution that propagates within a fiber without changing except for the scaling factor. All fibers have a limit on the number of modes that they can propagate, and have both spatial and polarization degrees of freedom.

Figure 2:
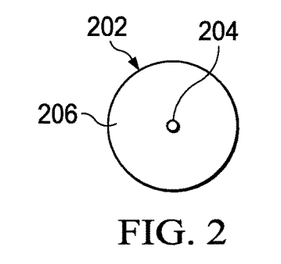
FIG. 2 illustrates a single mode fiber.

Single mode fibers (SMFs) 202 are illustrated in FIG. 2 and support propagation of two orthogonal polarizations of the fundamental mode only (N=2). For sufficiently large core radius and/or the core cladding difference, a fiber is multimoded for N>2 as illustrated in FIG. 4. For optical signals having orbital angular momentums and multilayer modulation schemes applied thereto, multimode fibers 410 that are weakly guided may be used. Weakly guided fibers have a core cladding refractive index difference that is very small. Most glass fibers manufactured today are weakly guided, with the exception of some photonic crystal fibers and air-core fibers. Fiber guide modes of multimode fibers 410 may be associated in step indexed groups where, within each group, modes typically having similar effective indexes are grouped together. Within a group, the modes are degenerate. However, these degeneracies can be broken in a certain fiber profile design.

We start by describing translationally invariant waveguide has a refractive index n=n(x, y), with $n_{co}$ being maximum refractive index ("core" of a waveguide), and $n_{cl}$ being refractive index of the uniform cladding, and ρ represents the maximum radius of the refractive index n. Due to translational invariance the solutions (or modes) for this waveguide can be written as:

$$E_j(x,y,z)=e_j(x,y)e^{i\beta_j z},$$

$$H_j(x,y,z)=h_j(x,y)e^{i\beta_j z},$$

where $\beta_j$ is the propagation constant of the j-th mode. Vector wave equation for source free Maxwell's equation can be written in this case as:

$$(\nabla^2+n^2k^2\beta_j^2)e_j=-(\nabla_t+i\beta_j\hat{z})(e_{tj}\cdot\nabla_t \ln(n^2))$$

$$(\nabla^2+n^2k^2\beta_j^2)h_j=-(\nabla_t\ln(n^2))\times((\nabla_t+i\beta_j\hat{z})\times h_j)$$

where $k=2\pi/\lambda$ is the free-space wavenumber, $\lambda$ is a free-space wavelength, $e_t=e_x\hat{x}+e_y\hat{y}$ is a transverse part of the electric field, $\nabla^2$ is a transverse Laplacian and $\nabla_t$ transverse vector gradient operator. Waveguide polarization properties are built into the wave equation through the $\nabla_t \ln(n^2)$ terms and ignoring them would lead to the scalar wave equation, with linearly polarized modes. While previous equations satisfy arbitrary waveguide profile $n(x, y)$, in most cases of interest, profile height parameter $\Delta$ can be considered small $\Delta \ll 1$, in which case waveguide is said to be weakly guided, or that weakly guided approximation (WGA) holds. If this is the case, a perturbation theory can be applied to approximate the solutions as:

$$E(x,y,z)=e(x,y)e^{i(\beta+\tilde{\beta})z}=(e_t+\hat{z}e_z)e^{i(\beta+\tilde{\beta})z}$$

$$H(x,y,z)=h(x,y)e^{i(\beta+\tilde{\beta})z}=(h_t+\hat{z}h_z)e^{i(\beta+\tilde{\beta})z}$$

where subscripts t and z denote transverse and longitudinal components respectively. Longitudinal components can be considered much smaller in WGA and we can approximate (but not neglect) them as:

$$e_z = \frac{i(2\nabla)^{\frac{1}{2}}}{V}(\rho\nabla_t \cdot e_t)$$

$$e_z = \frac{i(2\Delta)^{\frac{1}{2}}}{V}(\rho\nabla_t \cdot e_t)$$

$$h_z = \frac{i(2\nabla)^{\frac{1}{2}}}{V}(\rho\nabla_t \cdot h)$$

$$h_z = \frac{i(2\Delta)^{\frac{1}{2}}}{V}(\rho\nabla_t \cdot h_t)$$

Where $\Delta$ and $V$ are profile height and fiber parameters and transversal components satisfy the simplified wave equation.

$$(\nabla^2+n^2k^2-\beta_j^2)e_j=0$$

$$(\nabla^2+n^2k^2-\beta_j^2)e_j=0$$

Though WGA simplified the waveguide equation, further simplification can be obtained by assuming circularly symmetric waveguide (such as ideal fiber). If this is the case refractive index that can be written as:

$$n(r)=n^2_{co}(1-2f(R)\Delta)$$

where $f(R)\geq 0$ is a small arbitrary profile variation.

For a circularly symmetric waveguide, we would have propagation constants $\beta_{lm}$ that are classified using azimuthal (l) and radial (m) numbers. Another classification uses effective indices $n_{lm}$ (sometimes noted as $n^{eff}_{lm}$ or simply $n_{eff}$, that are related to propagation constant as: $\beta_{lm}=kn^{eff}$). For the case of $l=0$, the solutions can be separated into two classes that have either transverse electric ($TE_{0m}$) or transverse magnetic ($TM_{0m}$) fields (called meridional modes). In the case of $l\neq 0$, both electric and magnetic field have z-component, and depending on which one is more dominant, so-called hybrid modes are denoted as: $HE_{lm}$ and $EH_{lm}$.

Polarization correction $\delta\beta$ has different values within the same group of modes with the same orbital number (l), even in the circularly symmetric fiber. This is an important observation that led to development of a special type of fiber.

In case of a step refractive index, solutions are the Bessel functions of the first kind, $J_l(r)$, in the core region, and modified Bessel functions of the second kind, $K_l(r)$, in the cladding region.

In the case of step-index fiber the groups of modes are almost degenerate, also meaning that the polarization correction $\delta\beta$ can be considered very small. Unlike $HE_{11}$ modes, higher order modes (HOMs) can have elaborate polarizations. In the case of circularly symmetric fiber, the odd and even modes (for example $HE^{odd}$ and $HE^{even}$ modes) are always degenerate (i.e. have equal $n_{eff}$), regardless of the index profile. These modes will be non-degenerate only in the case of circularly asymmetric index profiles.

The optical fibers, making up the optical fiber connection 106 may be fabricated using a wide range of methods. These methods can be divided into so-called preform methods and methods of direct fiber production. Preform-based methods are most important at least in the context of glass fibers, whereas direct methods, e.g. based on extrusion, are common for plastic fibers.

Figure 6:
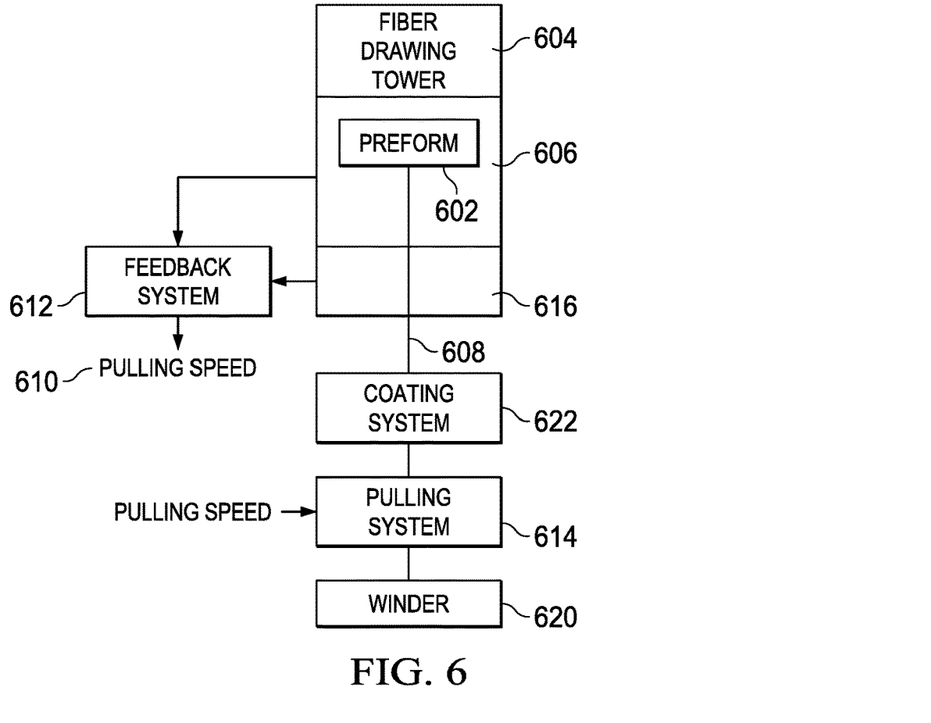
FIG. 6 illustrates an example of a system for drawing an optical fiber from a preform.

Referring now to FIG. 6, there is illustrated the manner in which a preform 602 is turned in to a fiber. Most glass fibers are fabricated by pulling from a preform 602 in a fiber drawing tower 604. The fiber drawing tower 604 is typically several meters high. The preform 602 is a glass rod with a diameter between 1 and 10 cm and having a length of roughly 1 m. Along its central axis, the preform 602 contains a region with an increased refractive index which will form the fiber core. When the preform 602 is heated close to its melting point in a furnace (oven) 606 at the top of the drawing tower 604, a thin fiber 608 can be pulled out of the bottom of the preform 602. The fiber 608 produced from a single preform 602 can be many kms long. During the pulling process, the fiber diameter is held constant by automatically adjusting the pulling speed using a pulling system 614 and also by possibly adjusting the furnace temperature with an automatic feedback system 612 that receives input from a diameter monitor 616 below the furnace 606.

Fiber pulling works well for silica fibers, since silica has a rather broad glass transition, i.e., a large range of temperatures in which the viscosity is in a suitable range. Other materials, e.g. fluoride fibers, have a much smaller temperature range suitable for pulling and the method is accordingly more delicate.

Before the fiber 608 is wound up using a winder 620, the fiber receives a polymer coating within a coating system 622 to provide mechanical and chemical protection. Such coating can consist of two or more different layers for optimum suppression of micro-bends. Typical coating materials used are acrylate, silicone and polyimide. Additional PVC (polyvinyl chloride) or similar protective coatings can be made by extrusion after the drawing process.

Several methods are used to manufacture preforms. Many fiber preforms are fabricated with a process called modified chemical vapor deposition (MCVD or just CVD) in which a highly controlled mixture of chemicals are carried to the inside of a rotating glass tube made of pure synthetic silicon dioxide. This method was developed for silica telecom fibers with contributions from University of Southampton (UK), Bell laboratories and Corning. A pure silica tube is mounted on a lathe equipped with a special heat torch.

Figure 7:
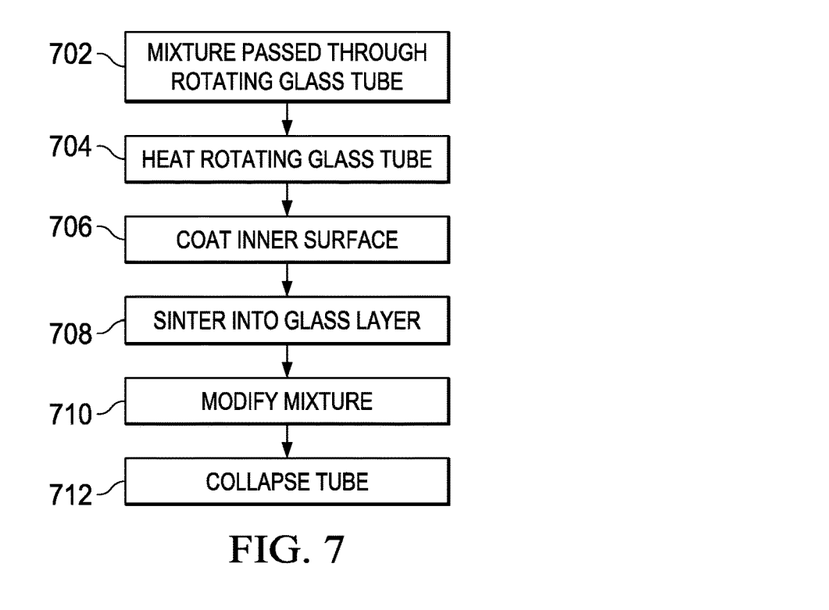
FIG. 7 illustrates a flow diagram describing the generation of a preform.

Referring now to FIG. 7 this process is more fully described, a mixture of oxygen, silicon tetrachloride ($SiCl_4$) and possibly other substances (e.g. germanium tetrachloride ($GeCl_4$) and rare earth dopants which may be used within the fiber core) is passed at step 702 through a rotating silica glass tube, which is heated at step 704 from the outside to approximately 1600° C. with a flame from the heat torch. Chemical reactions in the gas form a fine sort of silica (and possibly other substances) which coat the inner surface of the glass near the burner at step 706 and is sintered into a clear glass layer at step 708 in a process called vitrification. The particles are solid submicron particles, called soot. The material deposited in the tube will form the core region of the optical fiber. The burner is continuously moved back and forth along the tube. For every sweep of the burner, the manufacturer can modify the composition, viscosity and thickness of the deposited layer to produce specific fiber designs. This, in conjunction with the ability to change the speed at which the burner moves and the temperature of the flame, provides the ability to manufacture a wide range of ultrapure optical fiber types. Precise delivery of chemicals is insured by using equipment that performs accurately and consistently. The process is repeated for many hours to lay down subsequent core layers. Toward the end of the process, the gas mixture is modified at step 710 to form a layer with a higher refractive index, the precursor of the fiber core. Finally, at step 712, the chemical flow is shut off, the speed of the torch is decreased and the temperature of the flame increased so that the tube is collapsed into a solid rod by heating it to approximately 2000° C.

Various alternative vapor deposition methods have also been developed. These include outside vapor deposition (OVD); vapor phase axial deposition (VAD or AVD); plasma chemical vapor deposition (PCVD); plasma impulse chemical vapor deposition (PICVD); plasma enhanced chemical vapor deposition (PECVD); and plasma outside deposition (POD).

Outside vapor deposition (OVD) is a process where the silica soot is deposited on the surface of a target rod (e.g. a glass mandrel) rather than inside a tube as with MCVD. Together with the material precursor such as $SiCl_4$, a fuel gas such as hydrogen or methane is applied to a burner which is again moved along the rotating rod. After the deposition, the target rod is removed, and the preform is consolidated in a furnace, where it is also purged with a drying gas for lowering the hydroxyl content.

Vapor phase axial deposition (VAD) is similar to OVD, but uses a modified geometry where the deposition occurs at the end of the target rod. The rod is continuously pulled away from the burner, and very long preforms can be made. Consolidation of the material can be done in a separate zone melting process. An important difference between OVD and CVD is that the doping profile is determined only by the burner geometry rather than by a variation of the gas mixture over time.

Plasma chemical vapor deposition (PCVD) uses deposition inside a tube, similar to MCVD. However, microwaves instead of a burner are used for heating the deposition region. The deposition is slow but very precise. A modified method with particularly high precision is plasma impulse chemical vapor deposition (PICVD) where short microwave pulses are used. There is also plasma enhanced chemical vapor deposition (PECVD) operating at atmospheric pressure with a fairly high deposition rate.

The preforms for multimode fibers, particularly for large core fibers, are often fabricated using plasma outside deposition (POD) where an outer fluorine doped layer with depressed refractive index. The fiber cladding is made with a plasma torch. The core can then be made of pure silica without any dopant.

The general advantage of vapor deposition methods is that extremely low propagation losses down to below 0.2 DB dB/km can be achieved, because very high purity materials can be used and contamination is avoided. In particular, $SiCl_4$ and $GeCl_4$ are easily purified by distillation, as they are liquid at room temperature. Particularly when no hydrogen is present (e.g. as fuel gas), the water content of such preforms is very low, avoiding a strong loss peak at 1.4 μm, which would also affect the telecom bands in optical fiber communications.

The different vapor deposition methods differ in many respects, e.g. concerning the possible material purity, the degree, precision and flexibility of refractive index control, the mechanical strength of the fabricated fibers, and the deposition efficiency and speed. For materials were vapor deposition cannot be applied, the rod-in-tube technique is another option. Here, a rod of glass with a higher refractive index is inserted into a glass tube with a lower refractive index. Both can be reasonably well connected by heating, but great care is required to avoid bubbles and other disturbances. There are also casting methods where the molten core glass is poured into the cladding tube, or sucked into the tube using a vacuum pump.

Preforms for photonic crystal fibers containing small holes throughout out are usually fabricated by stacking capillary tubes and/or rods, in most cases made of pure fused silica. It is possible to introduce rare-earth-doped rods for active fiber devices.

For active fiber devices such as fiber lasers and fiber amplifiers, rare-earth-doped fibers are required. The fiber core is doped with rare earth ions, e.g. of erbium, neodymium, ytterbium or thulium. Additional dopants can modify the refractive index, improve the solubility for rare earth ions or modify the photosensitivity.

Not all dopants can be easily incorporated with vapor deposition methods, requiring convective material transport. In particular, precursors for rare earth dopants usually have a too low vapor pressure. One possibility to overcome this problem is to expose the source of rare earth ions to a higher temperature. For example, a glass tube is used for MCVD may contain an additional doping chamber or a porous silica part soap with a rare earth salt, which is heated with an additional burner.

Another common technique is a solution doping, where a porous silica frit (not yet containing rare earth ions) is deposited on the inner side of a hollow silica tube. This frit is soaked with a solution containing a rare earth salt (e.g. a chloride). The preform later needs to be further processed to form a dry and compact rare earth oxide layer.

Another alternative technique is direct nano particle depositions using an aerosol. This method allows for high doping concentrations with homogeneity and accurate control of the doping profile.

Figure 8:
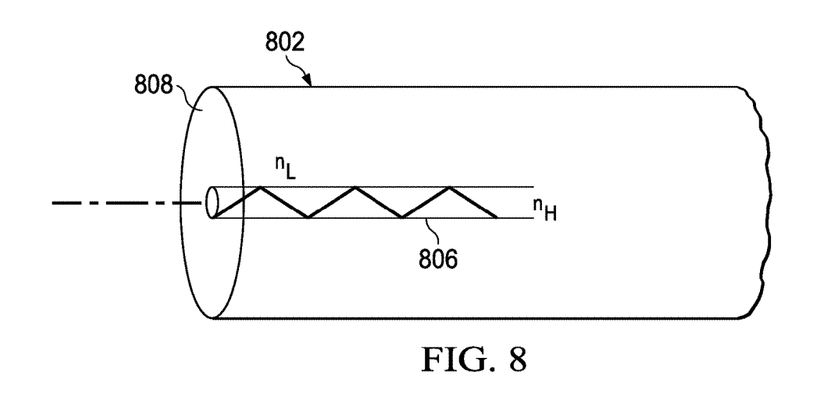
FIG. 8 illustrates a standard optical fiber.
Figure 9:
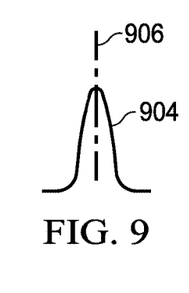
FIG. 9 illustrates the refractive index profile of the optical fiber of FIG. 8.

FIG. 8 illustrates a fiber 802 which propagates an optical beam therethrough. The fiber 802 includes a core 806 surrounded by a cladding 108. The index of refraction for the cladding 108 is represented by $n_L$ and the index of refraction for the core 106 is represented by $n_H$. Referring now also to FIG. 9, there is illustrated the profile 904 for the index of refraction between the core 806 and the cladding 808 for the fiber 802. The index of refraction has a peak along the centerline axis 904 associated with the central axis of the core 806.

Figure 10:
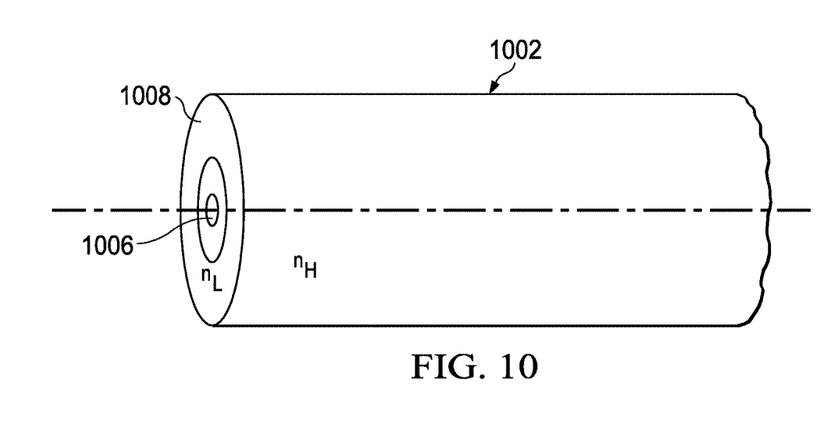
FIG. 10 illustrates a vortex optical fiber.
Figure 11:
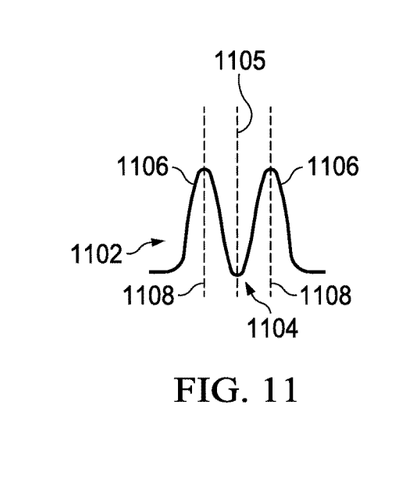
FIG. 11 illustrates the refractive index profile of the vortex optical fiber of FIG. 10.

A vortex optical fiber 1002, such as that illustrated in FIG. 10, further provides the ability to propagate optical signals including orbital angular momentum or other orthogonal functions of therethrough in a more efficient manner. The orbital angular momentum functions and orthogonal functions that can be transmitted with the fiber 1002 are more fully described with respect to U.S. patent application Ser. No. 15/357,808, entitled SYSTEM AND METHOD FOR COMMUNICATION USING ORBITAL ANGULAR MOMENTUM WITH MULTIPLE LAYER OVERLAY MODULATION and filed on Nov. 21, 2016, which is incorporated herein by reference in its entirety. The index of refraction for the core 1006 is represented by $n_H$ and the index of refraction for the cladding 1008 is represented by $n_L$. As shown in FIG. 11, the vortex fiber 1002 provides a profile 1102 of the index of refraction between the core 1006 and the cladding 1008 for the fiber 1002 as illustrated generally at 1102. The index of refraction includes a valley 1104 along the central axis 1105 of the core 1006 and a pair of peaks 1106 on each of the edge axis 1108 of the core.

Current methods for the production of vortex fibers 1002 that produce the index of refraction 1102 as illustrated with respect to FIG. 11 involve the use of costly doping processes as described hereinabove in order to achieve the index of refraction that best supports OAM or orthogonal function processed optical signals. Optical fibers are primarily composed of silicon dioxide ($SiO_2$) and minute amounts of other chemicals are added thereto. Other chemical compounds such as germanium tetrachloride ($GeCl_4$) and phosphorus oxychloride ($POCl_3$) can also be used to produce core fibers and outer shells or cladding with a function specific optical properties.

The cores of all standard communication fibers are primarily silica with varying amounts of germanium added to increase the fibers refractive index to the desired level. Single mode fibers typically include only small amounts of germanium and have a uniform composition within the cores. Multimode fibers usually have a much higher refractive index and therefore require much higher germanium content. Also the core composition and refractive index of multimode fibers may change across the core of the fiber to give the refractive index a parabolic shape. Because the refractive index changes across a cross-section of the core, these multimode products are called graded index fibers.

Figure 12:
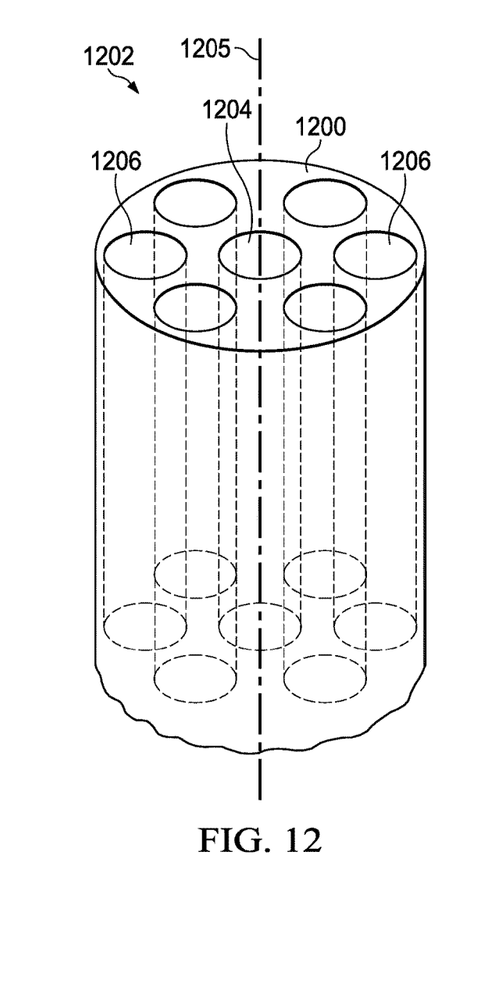
FIG. 12 illustrates a perspective view of a vortex fiber preform.

In order to achieve a vortex profile having an index of refractive profile 1102 similar to that illustrated in FIG. 11, a preform 1202 such as that illustrated in FIG. 12 is provided. The preform 1202 has a number of holes drilled therethrough prior to the drawing of the preform 1202. The holes comprise a central hole 1204 that is drilled through the central axis 1205 and the core of the preform 1202, and a series of periphery holes 1206 that are drilled between the center hole 1204 and the outer circumference of the preform 1202 through the cladding 1208 of the fiber preform 1202. The holes are drilled completely through the preform 1202. Drilling of the holes maybe achieved using lasers or other appropriate drilling technologies. While the preferred embodiment envisions the drilling of the holes 1204 and 1206, other methods or techniques for creating holes within the cross-section of the preform 1202 may also be used.

Figure 13:
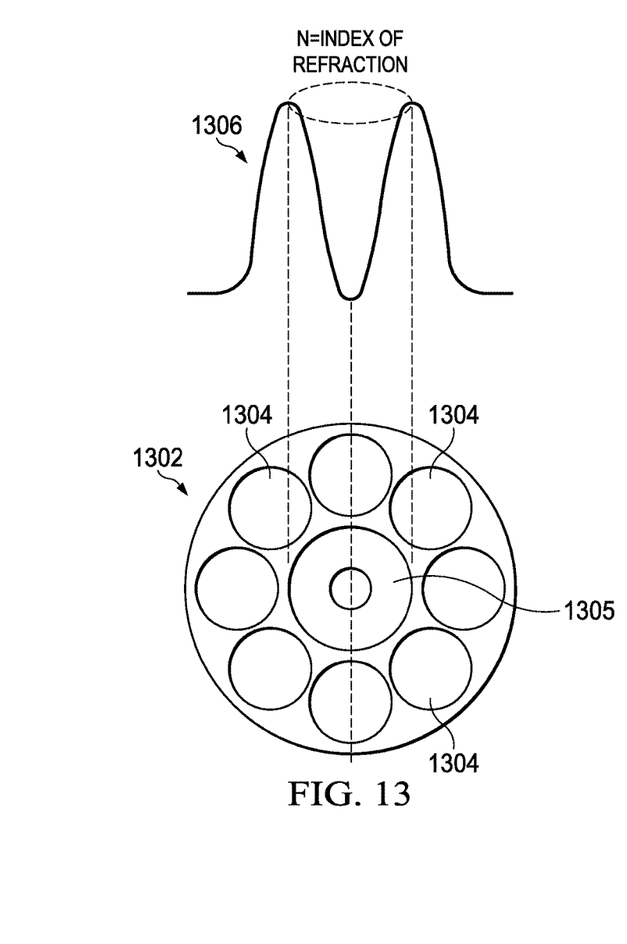
FIG. 13 illustrates a cross-sectional view of a vortex fiber.

Referring now to FIG. 13, there is illustrated a cross-section of the vortex fiber 1302 after completion of the fiber forming process which will be described herein below. As can be seen, the fiber 1302 includes the holes 1304 that were originally drilled within the preform surrounding a core 1305. The fiber 1302 provides the index of refraction 1306 of the fiber that is conducive to the propagation of OAM processed signals or orthogonal function processed signals. The one drawback associated with a fiber 1302 produced as described herein below is a loss of tensile strength. Fibers produced according to previous technologies will have a tensile resistance of 100,000 pounds per square inch. A vortex fiber produced according to the process described herein have a lower tensile resistance than this and thus may have limited utility in particular types of applications. The preform 1202 will have a cross-section such as that illustrated in FIG. 13, wherein the core 1302 is included within the center of the preform 1202 and the series of holes 1206 are located between the core 1302 and the circumference of the glass preform 1202.

Figure 14:
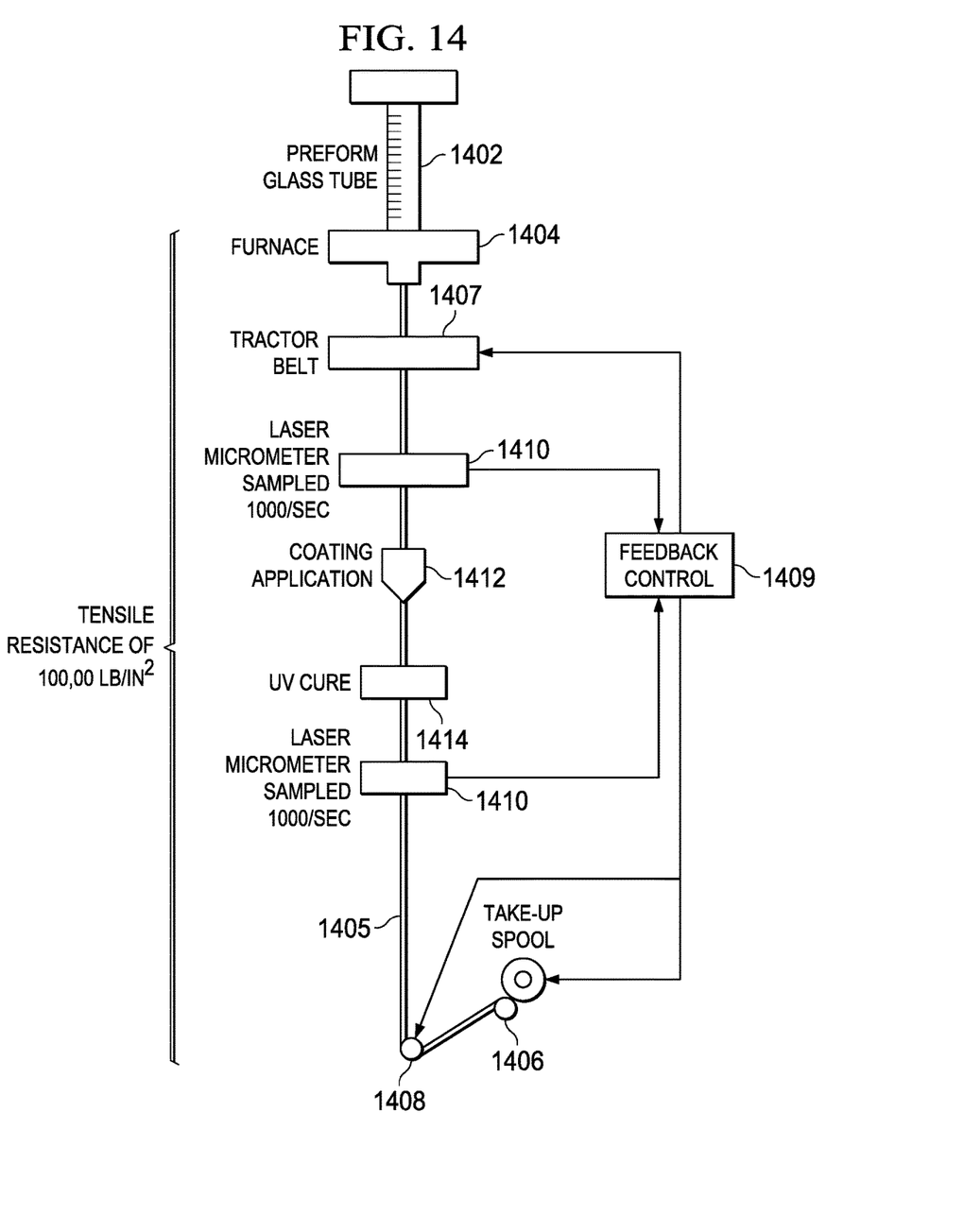
FIG. 14 illustrates the process for drawing a vortex optical fiber preform.
Figure 15:
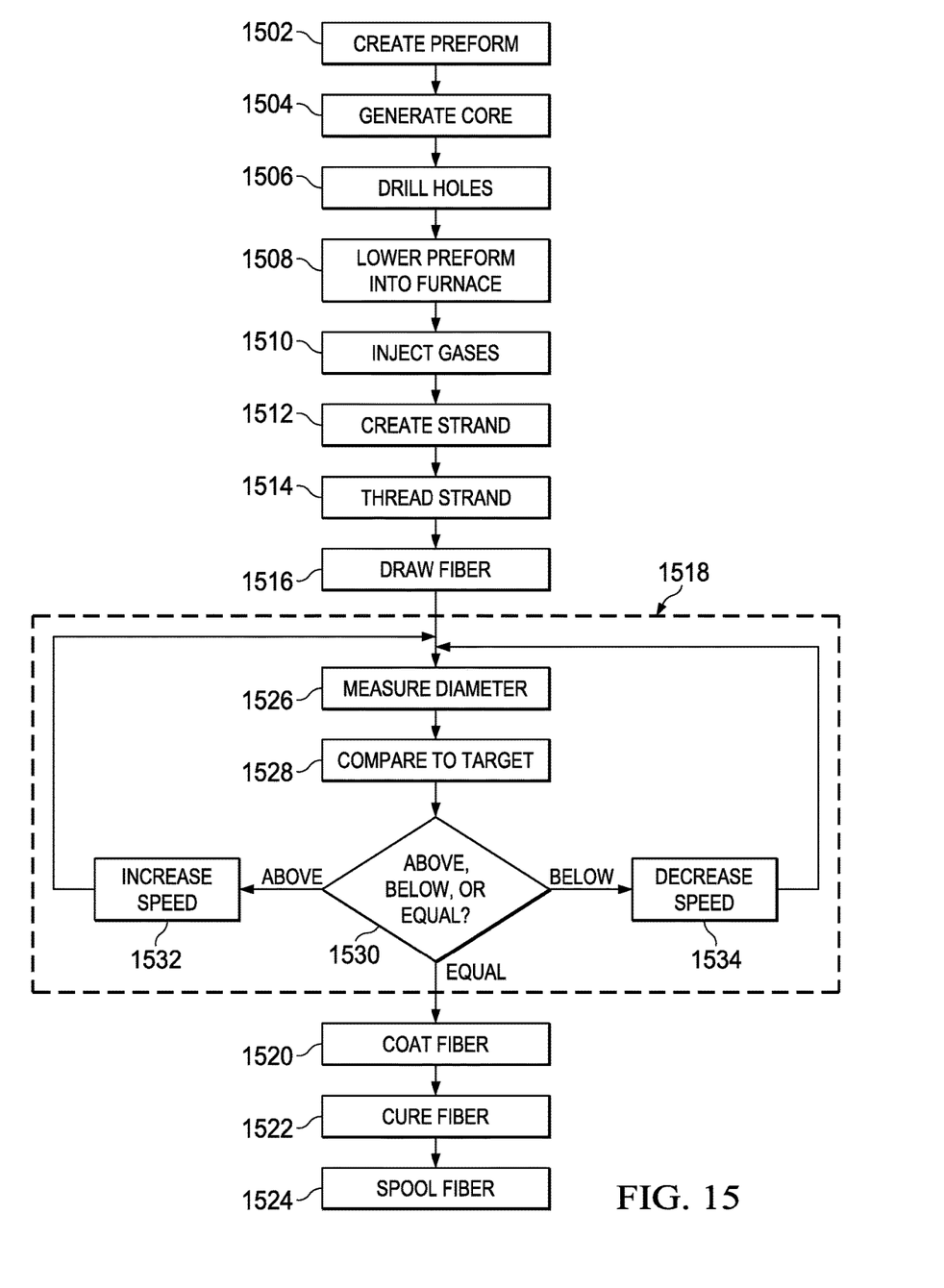
FIG. 15 is a flow diagram illustrating the process for generating a vortex optical fiber.

Referring now to FIG. 14 there is illustrated the components for performing a vortex fiber preform draw and in FIG. 15 a flow diagram more particularly describing the process. Once the glass preform 1402 has been drilled to include the holes to enable generation of the vortex optical fiber that better transmits orbital angular momentum and orthogonal function signals, the glass preform may be applied to a fiber forming process. In order to convert the preform 1402 into a fiber, a fiber draw operation is utilized. The drilled preform 1402 has its tip lowered into a high purity graphite furnace 1404. Pure gases are injected into the furnace 1404 to provide a clean and conductive atmosphere. Within the furnace 1404, tightly controlled temperatures approaching 1900° C. softened the tip of the preform 1402. The preform is heated to the optimum temperature to achieve an ideal drawing process. The temperature is under the control of the furnace 1404. Once the tip of the preform is heated, soft gravity begins to pull a molten glob until it is been stretched into a thin strand. The operator threads the thin strand through a series of devices and the drawing process may begin.

The fiber 1405 is pulled by a tractor belt 1407 at the bottom of the draw tower through several components and wound onto a take-up spool 1406 during the drawing process. Draw speeds of 10 to 20 m/s are not uncommon in the industry and may be controlled using a feedback control 1409 that controls the speed of the take-up spool 1406 and a tension roller 1408. During the draw process, the diameter of the fiber is controlled to a predetermined size using laser micrometers 1410. The laser micrometers 1410 are used as the fiber exits the furnace 1404 and prior to being taken up on the take-up spool 1406 to consistently control fiber diameter. The laser micrometers 1410 provide control signals of the measured diameter to the feedback control system 1409 which provides speed control signals to the tractor belt 1407, tension roller 1408 and take-up spool 1406. The laser micrometers 1410 can sample the diameter of the fiber at over 750 times per second. The actual value of the diameter is compared to a predetermined target, and slight deviations from targets are converted to changes in draw speed by the take-up spool 1406 and are fed to the tractor belt mechanism for correction. If the diameter of the fiber 1405 increases above target, the draw speed is increased. If the detected fiber diameter falls below the target, the draw speed is decreased.

Protective coatings are applied to the fiber 1405 via a coating application 1412. One or more different coating types may be applied to the fiber as it passes through the coating application 1412. The applied coating is UV cured using ultraviolet lamp 1414. The protective coating protects the surface of the fiber 1402 from harsh environments.

Referring now to FIG. 15, there is illustrated a flow diagram describing the process for creating a vortex fiber that better transmits orbital angular momentum processed signals and orthogonal function processed signals as described hereinabove. The preform is created at step 1502 using the process as described hereinabove to create the glass cylinder. A core having a desired refractive index is generated at step 1504. The holes disclosed herein above with respect to FIG. 13 are drilled at step 1506 within the preform between the core and the periphery of the preform and within the core. While one embodiment describes the drilling of the holes, as described above, other manners for creating the holes within the preform may be utilized. The preform is lowered into the furnace at step 1508 to begin heating the preform. The heating process is controlled by the injection of gases at step 1510 into the furnace in order to achieve the desired temperature. Once the preform is heated to the desired temperature, this will enable the creation of a strand at step 1512 based upon gravity acting upon the melting preform. The generated strand is threaded at step 1514 through the system components and on to a take-up spool. The fiber is drawn from the preform using a feedback control drawing process 1518 as illustrated within the dashed box. The generated fiber may be coated with various protective materials at step 1520 and cured, using for example UV technologies, at step 1522. The created and coated fiber is spooled at step 1524 until it is needed for use.

Referring now back to the feedback control step 1518, the drawn fiber has its diameter measured at one or more locations at step 1526. These diameter measurements are compared to target values at step 1528. The target value may be established prior to the drawing process by a user based upon the particular type of fiber that is being created. Inquiry step 1530 determines whether the measured fiber diameter is above, below or equal to the designated target value. If the diameter is above the target value control passes to step 1532 in order to increase the speed of the drawing process. This will cause a thinning of the fiber and control passes back to step 1526 to again measure the current fiber diameter. If inquiry step 1530 determines that the fiber diameter is below the target value, control passes to step 1534 wherein the speed of the drawing process is decreased in order to increase the size of the fiber. Control passes back to step 1526 to further measure the fiber diameter. If the fiber is at the designated target value, control passes on to step 1522 and continues the fiber drawing process. It will be realized that the fiber drawing speed control step 1528 will occur continuously throughout the fiber drawing process and its illustration between the drawing encoding fiber steps is for purposes of illustration only. The diameter of the fiber will be continuously monitored and adjusted throughout the creation of the fiber using a fiber draw process to maintain a substantially constant diameter.

It will be appreciated by those skilled in the art having the benefit of this disclosure that this system and method for producing a vortex optical fiber provides an optical fiber providing better transmission characteristics for orbital angular momentum processed and orthogonal function processed optical signals. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A vortex optical fiber prepared by a process comprising the steps of:
    generating a preform comprising a glass cylinder formed substantially of silicone dioxide that defines a core portion along a longitudinal axis of the glass cylinder and a cladding portion surrounding the core portion, wherein the glass cylinder further defines a plurality of holes running parallel to the longitudinal axis from a first end of the glass cylinder to a second end of the glass cylinder;
    heating the preform to generate a thread from the second end of the glass cylinder;
    drawing the thread at a predetermined speed using drawing components to generate the vortex optical fiber with a predetermined diameter;
    winding the vortex optical fiber onto a spool; and
    wherein the process generates the vortex optical fiber having the core portion along a second longitudinal axis of the vortex optical fiber and the cladding portion surrounding the core portion.

2. The vortex optical fiber of claim 1, wherein the step of generating further comprises the step of forming the core portion along the longitudinal axis within the glass cylinder.

3. The vortex optical fiber of claim 1, wherein the step of generating further comprises the step of creating the plurality of holes within the preform.

4. The vortex optical fiber of claim 3, wherein the step of creating further comprises drilling the plurality of holes within the preform.

5. The vortex optical fiber of claim 1, wherein the step of generating further comprises generating the preform to include a first hole along the longitudinal axis of the glass cylinder through the core portion and a plurality of second holes located between the first hole and a circumference of the glass cylinder through the cladding portion.

6. The vortex optical fiber of claim 1, wherein the preform defines a refractive index profile that contains a valley along the longitudinal axis of the glass cylinder and a pair of peaks along edges of the core portion within the cladding portion.

7. The vortex optical fiber of claim 6, wherein the vortex optical fiber defines a second refractive index profile that contains a valley along the longitudinal axis of the glass cylinder and a pair of peaks along edges of the core portion within the cladding portion.

8. A method for generating a vortex optical fiber comprising:
    generating a preform comprising a glass cylinder formed substantially of silicone dioxide that defines a core portion along a longitudinal axis of the glass cylinder and a cladding portion surrounding the core portion, wherein the glass cylinder further defines a plurality of holes running parallel to the longitudinal axis from a first end of the glass cylinder to a second end of the glass cylinder;
    heating the preform to generate a thread from the second end of the glass cylinder;
    drawing the thread at a predetermined speed using drawing components to generate the vortex optical fiber with a predetermined diameter;
    winding the vortex optical fiber onto a spool; and
    wherein the process generates the vortex optical fiber having the core portion along a second longitudinal axis of the vortex optical fiber and the cladding portion surrounding the core portion.

9. The method of claim 8, wherein the step of generating further comprises forming the core portion along the longitudinal axis within the glass cylinder.

10. The method of claim 8, wherein the step of generating further comprises creating the plurality of holes within the preform.

11. The method of claim 10, wherein the step of creating further comprises drilling the plurality of holes within the preform.

12. The method of claim 8, wherein the step of generating further comprises generating the preform to include a first hole along the longitudinal axis of the glass cylinder through the core portion and a plurality of second holes located between the first hole and a circumference of the glass cylinder through the cladding portion.

13. The method of claim 8, wherein the preform defines a refractive index profile that contains a valley along the longitudinal axis of the glass cylinder and a pair of peaks along edges of the core portion within the cladding portion.

14. The method of claim 13, wherein the vortex optical fiber defines a second refractive index profile that contains a valley along the longitudinal axis of the glass cylinder and a pair of peaks along edges of the core portion within the cladding portion.

15. The method claim 8 further comprising the step of coating the fiber with a protecting coating.

16. The method of claim 8, wherein the step of drawing further comprises the steps of:
- determining a current diameter of the vortex optical fiber drawn from the preform;
- comparing the current diameter of the vortex optical fiber to the predetermined diameter;
- increasing a draw speed if the current diameter of the vortex optical fiber exceeds the predetermined diameter; and
- decreasing a draw speed of the current diameter of the vortex optical fiber falls below the predetermined diameter.

* * * * *